(12) United States Patent
Takahashi et al.

(10) Patent No.: US 8,767,376 B2
(45) Date of Patent: Jul. 1, 2014

(54) ELECTRIC DOUBLE LAYER CAPACITOR

(75) Inventors: Kenzou Takahashi, Sakai (JP); Meiten Koh, Settsu (JP); Mai Koyama, Settsu (JP); Emi Miyanaga, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 55 days.

(21) Appl. No.: 13/514,848

(22) PCT Filed: Nov. 26, 2010

(86) PCT No.: PCT/JP2010/071123
§ 371 (c)(1),
(2), (4) Date: Jun. 8, 2012

(87) PCT Pub. No.: WO2011/070925
PCT Pub. Date: Jun. 16, 2011

(65) Prior Publication Data
US 2012/0243145 A1    Sep. 27, 2012

(30) Foreign Application Priority Data
Dec. 11, 2009    (JP) .................................. 2009-282022

(51) Int. Cl.
*H01G 9/00*    (2006.01)
*H01G 9/02*    (2006.01)

(52) U.S. Cl.
USPC .......................................... 361/502; 252/62.2

(58) Field of Classification Search
USPC .................................. 361/502, 503; 252/62.2
See application file for complete search history.

(56) References Cited

U.S. PATENT DOCUMENTS

| 8,236,191 B2 * | 8/2012 | Koh et al. ..................... 252/62.2 |
| 8,372,300 B2 * | 2/2013 | Oka et al. ..................... 252/62.2 |
| 2007/0042271 A1 * | 2/2007 | Nishida et al. ................ 429/306 |
| 2008/0145763 A1 | 6/2008 | Koh et al. |
| 2011/0008681 A1 | 1/2011 | Koh et al. |

FOREIGN PATENT DOCUMENTS

| JP | 8-306591 A | 11/1996 |
| JP | 2000-208372 A | 7/2000 |
| JP | 2000-294281 A | 10/2000 |
| WO | 2006/088009 A1 | 8/2006 |
| WO | 2009/035085 A1 | 3/2009 |

* cited by examiner

Primary Examiner — Eric Thomas
(74) Attorney, Agent, or Firm — Sughrue Mion, PLLC

(57) ABSTRACT

An object of the present invention is to provide an electric double layer capacitor which has a high withstand voltage, and is resistant to degradation and excellent in long term reliability. Disclosed is an electrolytic solution for an electric double layer capacitor including a solvent (I) for dissolving an electrolyte salt and an electrolyte salt (II), wherein the solvent (I) for dissolving an electrolyte salt includes a sulfolane compound and a fluorine-containing chain ether. Also disclosed is an electric double layer capacitor using the electrolytic solution.

5 Claims, No Drawings

ELECTRIC DOUBLE LAYER CAPACITOR

CROSS REFERENCE TO RELATED APPLICATIONS

This application is a National Stage of International Application No. PCT/JP2010/071123 filed Nov. 26, 2010, claiming priority based on Japanese Patent Application No. 2009-282022, filed Dec. 11, 2009, the contents of all of which are incorporated herein by reference in their entirety.

TECHNICAL FIELD

The present invention relates to an electrolytic solution for an electric double layer capacitor and an electric double layer capacitor including the electrolytic solution.

BACKGROUND ART

Solvents for dissolving an electrolyte salt for use in an electric double layer capacitor in which at least one of a positive electrode and a negative electrode is a polarizable electrode need to be stable at a withstand voltage of 3 V or more. From this point of view, a combined use of ethylene carbonate and propylene carbonate, which is a cyclic carbonate having a high oxidation potential (withstand voltage), has been proposed (Patent Document 1). The withstand voltage is limited to about 2.7 V, however.

Further, Patent Document 2 proposes using a non-aqueous solvent including sulfolane or a derivative thereof and a specific chain carbonic acid ester (chain carbonate) for the purpose of improvement in withstand voltage.
Patent Document 1: JP 2000-208372 A
Patent Document 2: JP 08-306591 A

SUMMARY OF THE INVENTION

Problems to be Solved by the Invention

However, in the conventional techniques as described above, high withstand voltage and long life, which are the characteristics required for electric double layer capacitors, cannot always be achieved with good balance. In particular, the electrolytic solution of Patent Document 2 should be further improved in terms of long term reliability since the internal resistance of the capacitor is high. In the Examples, only a small-sized electricity storage device using a coin-type cell was used and evaluation was not performed for wound-type cells, which are used for load leveling, power regeneration, and instantaneous large current supply for motor vehicles and industrial applications.

An object of the present invention is to provide an electric double layer capacitor which has a high withstand voltage, and is resistant to degradation and excellent in long term reliability.

Means for Solving the Problems

Specifically, the present invention relates to an electrolytic solution for an electric double layer capacitor including a solvent (I) for dissolving an electrolyte salt and an electrolyte salt (II), wherein the solvent (I) for dissolving an electrolyte salt comprises a sulfolane compound (Ia) and a fluorine-containing chain ether (Ib).

The present invention also relates to an electric double layer capacitor including the electrolytic solution of the present invention.

Effects of the Invention

The present invention can provide an electric double layer capacitor which has a high withstand voltage and is excellent in long term reliability.

Further, the present invention can also provide an electric double layer capacitor having high energy capacity because a high withstand voltage increases the capacity of energy accumulated.

MODES FOR CARRYING OUT THE INVENTION

The electrolytic solution for an electric double layer capacitor of the present invention includes a specific mixed solvent (I) for dissolving an electrolyte salt and an electrolyte salt (II).

The specific mixed solvent for dissolving an electrolyte salt used in the present invention includes a sulfolane compound (Ia) and a fluorine-containing chain ether (Ib).

The sulfolane compound (Ia) may be a non-fluorine-containing sulfolane compound or a fluorine-containing sulfolane compound.

Examples of the non-fluorine-containing sulfolane compound include, in addition to sulfolane, non-fluorine-containing sulfolane derivatives represented by:

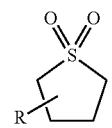

wherein R is an alkyl group having 1 to 4 carbon atoms.

Among these compounds, the following compounds are preferred because they allow the electrolytic solution of the present invention to have particularly good properties such as high dielectric constant and high withstand voltage and to be improved in terms of solubility of an electrolyte salt and reduction in internal resistance.

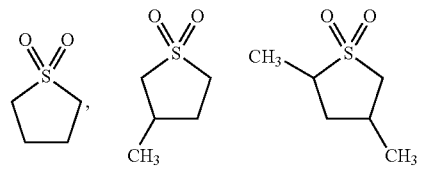

Examples of the fluorine-containing sulfolane compound include fluorine-containing sulfolane compounds described in JP 2003-132994 A. In particular, the following compounds are preferred.

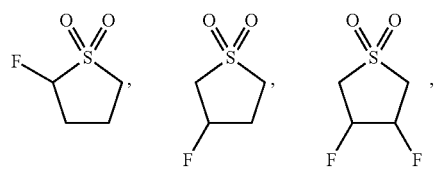

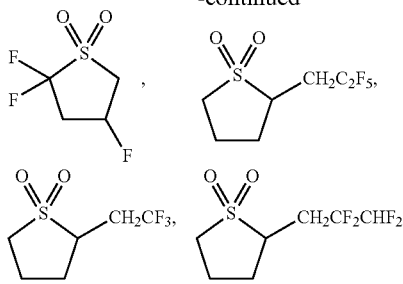

Among these compounds, sulfolane, 3-methylsulfolane, and 2,4-dimethylsulfolane, which are excellent in oxidation resistance and have high decomposition voltage, are preferred, and sulfolane is particularly preferred.

Examples of the fluorine-containing chain ether (Ib) include compounds described in JP 08-37024 A, JP 09-97627 A, JP 11-26015 A, JP 2000-294281 A, JP 2001-52737 A, and JP 11-307123 A.

Especially, preferred are fluorine-containing chain ethers represented by the formula (Ib):

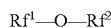

wherein $Rf^1$ is a fluoroalkyl group having 1 to 10 carbon atoms; and $Rf^2$ is an alkyl group having 1 to 4 carbon atoms which may contain a fluorine atom. $Rf^2$ in the above formula (Ib) is preferably a fluorine-containing alkyl group because such a compound provides excellent oxidation resistance and particularly excellent compatibility with an electrolyte salt, has a high decomposition voltage, and allows maintenance of low temperature characteristics due to its low freezing point, compared to a compound in which $Rf^2$ is a non-fluorine-containing alkyl group.

Particularly, examples of $Rf^1$ include fluorine-containing alkyl groups having 1 to 10 carbon atoms, such as $HCF_2CF_2CH_2$—, $HCF_2CF_2CF_2CH_2$—, $HCF_2CF_2CF_2CF_2CH_2$—, $C_2F_5CH_2$—, $CF_3CFHCF_2CH_2$—, $HCF_2CF(CF_3)CH_2$—, $C_2F_5CH_2CH_2$—, and $CF_3CH_2CH_2$—.

Preferred are fluorine-containing alkyl groups having 3 to 6 carbon atoms. Further, examples of $Rf^2$ include non-fluorine-containing alkyl groups having 1 to 4 carbon atoms, —$CF_2CF_2H$, —$CF_2CFHCF_3$, —$CF_2CF_2CF_2H$, —$CH_2CH_2CF_3$, —$CH_2CFHCF_3$, and —$CH_2CH_2C_2F_5$. Preferred are fluorine-containing alkyl groups having 2 to 4 carbon atoms. Among them, it is particularly preferred from the viewpoint of good ion conductivity that $Rf^1$ be a fluorine-containing alkyl group having 3 to 4 carbon atoms and $Rf^2$ be a fluorine-containing alkyl group having 2 to 3 carbon atoms.

Specific examples of the fluorine-containing chain ether (Ib) include one or two or more of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$, and $CF_3CF_2CH_2OCH_2CFHCF_3$. Among them, $HCF_2CF_2CH_2OCF_2CF_2H$, $HCF_2CF_2CH_2OCF_2CFHCF_3$, $CF_3CF_2CH_2OCF_2CFHCF_3$, and $CF_3CF_2CH_2OCF_2CF_2H$ are particularly preferred in term of high decomposition voltage and maintenance of low-temperature characteristics.

The solvent for dissolving an electrolyte salt used for the electric double layer capacitor of the present invention can improve the withstand voltage of a capacitor and reduce the internal resistance thereof only by the combination of a sulfolane compound (Ia) with a fluorine-containing chain ether (Ib). This combination can also improve long term reliability (for example, high temperature load characteristics and charge-discharge cycle characteristics). Other solvents such as a cyclic carbonate (Ic) and a chain carbonate (Id) may be optionally blended.

The cyclic carbonate (Ic) may be a non-fluorine-containing cyclic carbonate or a fluorine-containing cyclic carbonate.

Examples of the non-fluorine-containing cyclic carbonate include ethylene carbonate (EC), propylene carbonate (PC), and vinylene carbonate. Among them, propylene carbonate (PC) is preferred in terms of an effect of reducing internal resistance and maintenance of low-temperature characteristics.

Examples of the fluorine-containing cyclic carbonate include mono-, di-, tri- or tetra-fluoroethylene carbonate and trifluoromethyl ethylene carbonate. Among them, trifluoromethyl ethylene carbonate is preferred in terms of improvement in withstand voltage of a capacitor.

The chain carbonate (Id) may be a non-fluorine-containing chain carbonate or a fluorine-containing chain carbonate.

Examples of the non-fluorine-containing chain carbonate include dimethyl carbonate (DMC), diethyl carbonate (DEC), ethyl methyl carbonate (EMC), methyl isopropylene carbonate (MIPC), ethyl isopropyl carbonate (EIPC), and 2,2,2-trifluoroethyl methyl carbonate (TFEMC). Among them, dimethyl carbonate (DMC) is preferred in terms of an effect of reducing internal resistance and maintenance of low-temperature characteristics.

Examples of the fluorine-containing chain carbonate include chain carbonates represented by formula:

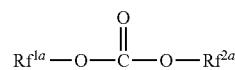

wherein $Rf^{1a}$ is an alkyl group, preferably an alkyl group having 1 to 3 carbon atoms, or is a fluoroalkyl group having a moiety at the end and preferably having a fluorine content of 10 to 76% by mass, the moiety being represented by the formula:

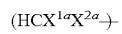

wherein $X^{1a}$ and $X^{2a}$ are the same or different and are each H or F; and $Rf^{2a}$ is a fluoroalkyl group which has, at a terminal, the moiety represented by the above formula or —$CF_3$ and preferably has a fluorine content of 10 to 76% by mass;

fluorine-containing chain carbonates represented by formula:

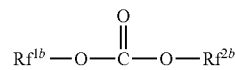

wherein $Rf^{1b}$ is a fluorine-containing ether group having $CF_3$ at the end and having a fluorine content of 10 to 76% by mass, and $Rf^{2b}$ is a fluorine-containing ether or alkyl group having a fluorine content of 10 to 76% by mass; and fluorine-containing chain carbonates represented by formula:

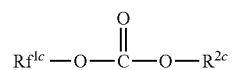

wherein $Rf^{1c}$ is a fluorine-containing ether group having a fluorine content of 10 to 76% by mass and having, at the end, a moiety represented by the formula:

wherein $X^{1c}$ is H or F, and $R^{2c}$ is an alkyl group in which a hydrogen atom may be substituted with a halogen atom and a hetero atom may be contained in its chain.

Preferred examples of usable fluorine-containing chain carbonates include chain carbonates represented by formula:

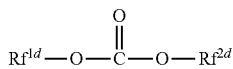

wherein $Rf^{1d}$ and $Rf^{2d}$ are a combination of fluorine-containing groups such as $H(CF_2)_2CH_2$—, $FCH_2CF_2CH_2$—, $H(CF_2)_2CH_2CH_2$—, $CF_3CF_2CH_2$—, $CF_3CH_2CH_2$—, $CF_3CF(CF_3)CH_2CH_2$—, $C_3F_7OCF(CF_3)CH_2$—, $CF_3OCF(CF_3)CH_2$—, and $CF_3OCF_2$—.

Among the fluorine-containing chain carbonates, the following compounds are preferred in terms of an effect of reducing internal resistance and maintenance of low-temperature characteristics.

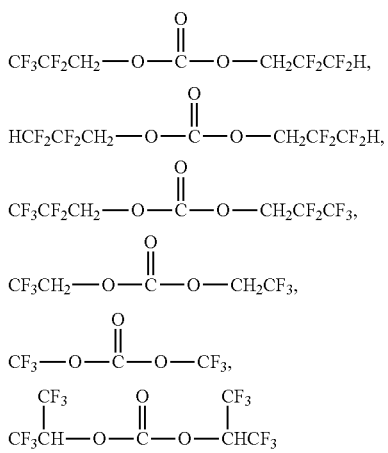

Other examples of the fluorine-containing chain carbonate include the following compounds.

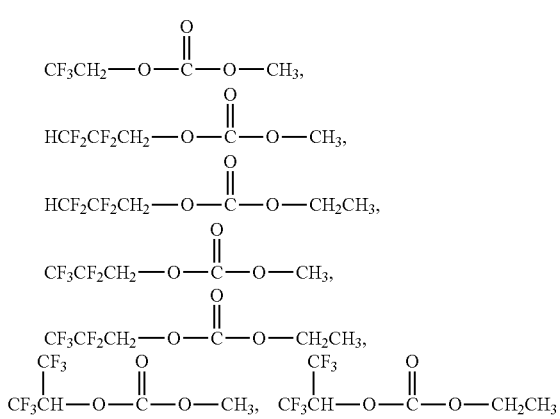

Examples of the other solvents that can be blended include fluorine-containing cyclic ethers such as

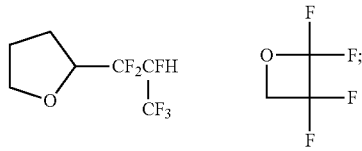

fluorine-containing lactones such as

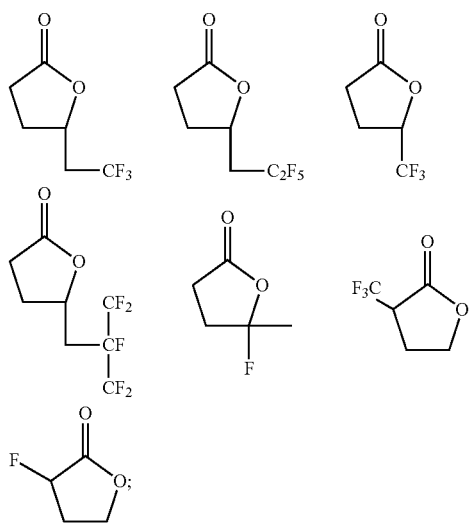

and nitrile-based solvents, furans, and oxolanes.

The percentage of the sulfolane compound (Ia) in the solvent for dissolving an electrolyte salt is preferably 100% by volume or less, more preferably 90% by volume or less, particularly preferably 75% by volume or less, and it is preferably 10% by volume or more. When the percentage is in this range, excellent effects of maintaining withstand voltage and reducing internal resistance are produced.

The percentage of the fluorine-containing chain ether (Ib) in the solvent for dissolving an electrolyte salt is preferably 90% by volume or less, more preferably 80% by volume or less, particularly preferably 75% by volume or less, and it is preferably 5% by volume or more. When the percentage is in this range, excellent effects of maintaining withstand voltage and reducing internal resistance are produced.

The percentage of the sum of the sulfolane compound (Ia) and the fluorine-containing chain ether (Ib) in the solvent for dissolving an electrolyte salt is preferably 50 to 100% by volume, more preferably 60 to 100% by volume, particularly preferably 70 to 100% by volume.

The blending amount of the other solvents in the solvent for dissolving an electrolyte salt is preferably 50% by volume or less, more preferably 40% by volume or less, particularly preferably 30% by volume or less.

Next, the electrolyte salt (II) which is the other component of the electrolytic solution used in the present invention will be described.

Examples of the electrolyte salt (II) usable in the present invention includes, in addition to conventionally known ammonium salts and metal salts, liquid salts (ionic liquid), inorganic polymer salts, and organic polymer salts.

With respect to the electrolyte salts, a particularly suitable compound is selected depending on the purpose of using the electrolytic solution. Specific examples of the suitable electrolyte salts for capacitors include, but are not limited to, ammonium salts. Note that in applications other than capacitors, known electrolyte salts in the applications can be optionally used.

Next, ammonium salts suitable as the electrolyte salt for capacitors will be illustrated.

(IIA) Tetraalkyl Quaternary Ammonium Salts

Preferred examples of tetraalkyl quaternary ammonium salts include those represented by formula (IIA):

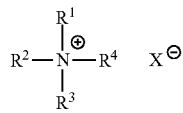

wherein $R^1$, $R^2$, $R^3$, and $R^4$ are the same or different and are each an alkyl group having 1 to 6 carbon atoms which may contain an ether bond; and X is an anion. In addition, tetraalkyl quaternary ammonium salts in which a part or all of the hydrogen atoms are substituted with fluorine atoms and/or fluorine-containing alkyl groups having 1 to 4 carbon atoms are also preferred in terms of improvement in oxidation resistance.

Specific examples include tetraalkyl quaternary ammonium salts represented by formula (IIA-1):

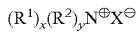

wherein $R^1$, $R^2$ and X are the same as described above; and x and y are the same or different and are each an integer of 0 to 4, and x+y=4; and alkylether group-containing trialkylammonium salts represented by formula (IIA-2):

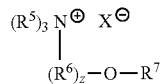

wherein $R^5$ is an alkyl group having 1 to 6 carbon atoms; $R^6$ is a divalent hydrocarbon group having 1 to 6 carbon atoms; $R^7$ is an alkyl group having 1 to 4 carbon atoms; z is 1 or 2; and X is an anion. Viscosity can be reduced by introducing an alkyl ether group.

The anion $X^-$ may be an inorganic anion or an organic anion. Examples of the inorganic anion include $AlCl_4^-$, $BF_4^-$, $PF_6^-$, $AsF_6^-$, $TaF_6^-$, $I^-$, and $SbF_6^-$. Examples of the organic anion include $CF_3COO^-$, $CF_3SO_3^-$, $(CF_3SO_2)_2N^-$, and $(C_2F_5SO_2)_2N^-$.

Among these, $BF_4^-$, $PF_6^-$, $AsF_6^-$, and $SbF_6^-$ are preferred in terms of good oxidation resistance and ionic dissociation.

Specific examples of suitable tetraalkyl quaternary ammonium salts include $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeBF_4$, $Et_3MeClO_4$, $Et_3MePF_6$, $Et_3MeAsF_6$, $Et_3MeSbF_6$, $Et_3MeCF_3SO_3$, $Et_3Me(CF_3SO_2)_2N$, and $Et_3MeC_4F_9SO_3$. In particular, $Et_4NBF_4$, $Et_4NPF_6$, $Et_4NSbF_6$, $Et_4NAsF_6$, $Et_3MeBF_4$, and an N,N-diethyl-N-methyl-N-(2-methoxyethyl)ammonium salt are representative.

(IIB) Spiro-Bipyridinium Salts

Preferred examples of spiro-bipyridinium salts include those represented by formula (IIB):

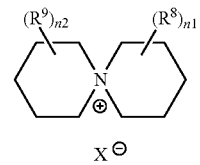

wherein $R^8$ and $R^9$ are the same or different and are each an alkyl group having 1 to 4 carbon atoms; X is an anion; n1 is an integer of 0 to 5; and n2 is an integer of 0 to 5. In addition, spiro-bipyridinium salts in which a part or all of the hydrogen atoms are substituted with fluorine atoms and/or fluorine-containing alkyl groups having 1 to 4 carbon atoms are also preferred in terms of improvement in oxidation resistance.

Specifically, preferred examples of the anion $X^-$ are the same as in (IIA).

Preferred specific examples include the following.

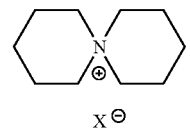

These spiro-bipyridinium salts are excellent in terms of solubility, oxidation resistance, and ion conductivity.

(IIC): Imidazolium Salts

Preferred examples of imidazolium salts include those represented by formula (IIC):

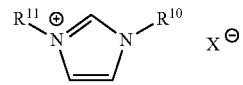

wherein $R^{10}$ and $R^{11}$ are the same or different and are each an alkyl group having 1 to 6 carbon atoms; and X is an anion. In addition, imidazolium salts in which a part or all of the hydrogen atoms are substituted with fluorine atoms and/or fluorine-containing alkyl groups having 1 to 4 carbon atoms are also preferred in terms of improvement in oxidation resistance.

Specifically, preferred examples of the anion $X^-$ are the same as in (IIA).

Preferred specific examples include the following.

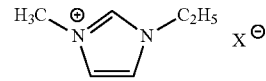

These imidazolium salts are excellent in terms of low viscosity and good solubility.

(IID): N-alkylpyridinium Salts

Preferred examples of N-alkylpyridinium salts include those represented by formula (IID):

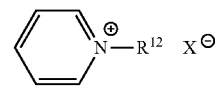

wherein $R^{12}$ is an alkyl group having 1 to 6 carbon atoms; and X is an anion. In addition, N-alkylpyridinium salts in which a part or all of the hydrogen atoms are substituted with fluorine atoms and/or fluorine-containing alkyl groups having 1 to 4 carbon atoms are also preferred in terms of improvement in oxidation resistance.

Specifically, preferred examples of the anion X⁻ are the same as in (IIA).

Preferred specific examples include the following.

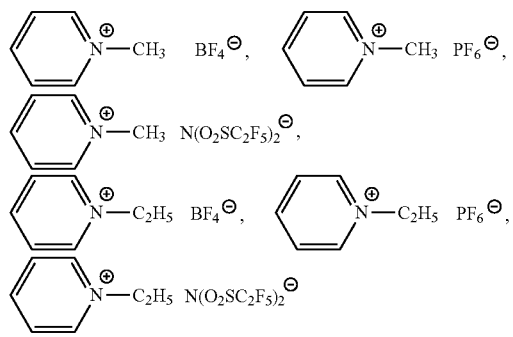

These N-alkylpyridinium salts are excellent in terms of low viscosity and good solubility.

(IIE) N,N-dialkylpyrrolidinium Salts

Preferred examples of N,N-dialkylpyrrolidinium salts include those represented by the following formula:

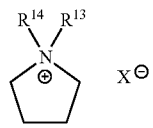

wherein $R^{13}$ and $R^{14}$ are the same or different and are each an alkyl group having 1 to 6 carbon atoms; and X is an anion. In addition, N,N-dialkylpyrrolidinium salts in which a part or all of the hydrogen atoms of the salt are substituted with fluorine atoms and/or fluorine-containing alkyl groups having 1 to 4 carbon atoms are also preferred in terms of improvement in oxidation resistance.

Specifically, preferred examples of the anion X⁻ are the same as in (IIA).

Preferred specific examples include the following.

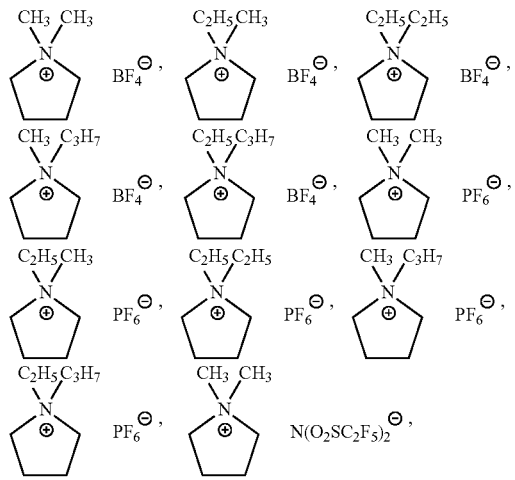

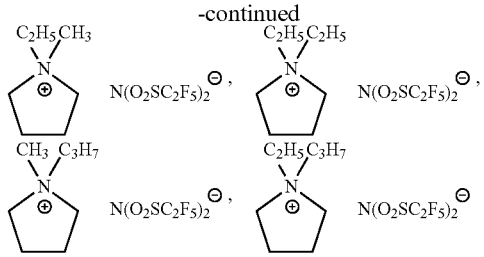

These N,N-dialkylpyrrolidinium salts are excellent in terms of low viscosity and good solubility.

Among these ammonium salts, the ammonium salts (IIA), (IIB), and (IIC) are preferred in terms of good solubility, oxidation resistance, and ion conductivity. More specifically, the following salts are preferred:

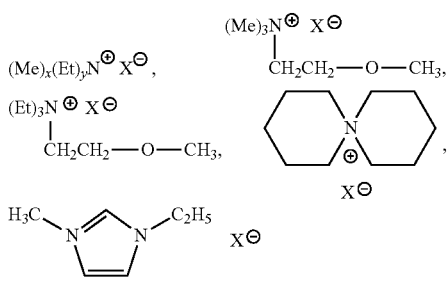

wherein Me is a methyl group; Et is an ethyl group; and X, x, and y are the same as in formula (IIA-1).

Alternatively, the electrolyte salt may be a lithium salt. Examples of preferred lithium salts include $LiPF_6$, $LiBF_4$, $LiAsF_6$, $LiSbF_6$, and $LiN(SO_2C_2H_5)_2$.

A magnesium salt may also be used in order to improve capacity. Examples of preferred magnesium salts include $Mg(ClO_4)_2$ and $Mg(OOC_2H_5)_2$.

Among these, spiro-bipyridinium tetraborate, triethylmethylammonium tetraborate, or tetraethylammonium tetraborate is preferred in terms of maintenance of low-temperature characteristics.

The concentration of the electrolyte salt (II) differs depending on the required current density, applications, the type of electrolyte salts, and the like, and is preferably 0.3 mol/l or more, more preferably 0.5 mol/l or more, particularly preferably 0.8 mol/l or more, and preferably 3.6 mol/l or less, more preferably 2.0 mol/l or less, particularly preferably 1.6 mol/l or less.

The electrolytic solution used in the present invention is prepared by dissolving the electrolyte salt (II) in the solvent (I) for dissolving the electrolyte salt.

The electrolytic solution of the present invention may be combined with a polymer material that dissolves or swells in the solvent of the electrolytic solution of the present invention so as to be in a (plasticized) gel form.

Examples of such polymer materials include conventionally known polyethylene oxides and polypropylene oxides and modified compounds thereof (JP 08-222270 A and JP 2002-100405 A); polyacrylate polymers, polyacrylonitrile, and fluororesins such as polyvinylidene fluoride, vinylidene fluoride-hexafluoropropylene copolymers (JP 1992-506726 T, JP 1996-507407 T, and JP 10-294131 A); and composites of these fluororesins and hydrocarbon resins (JP 11-35765 A and JP 11-86630 A). In particular, polyvinylidene fluoride and vinylidene fluoride-hexafluoropropylene copolymers are preferably used as polymer materials for the gel electrolytic solution.

In addition, ion-conductive compounds described in JP 2006-114401 A can also be used.

These ion-conductive compounds are non-crystalline fluorine-containing polyether compounds that contain a fluorine-containing group in a side chain and are represented by the formula (1-1):

$$P\text{-}(D)\text{-}Q \tag{1-1}$$

wherein D is represented by the formula (2-1):

$$\text{-}(D1)_n\text{-}(FAE)_m\text{-}(AE)_p\text{-}(Y)_q\text{—} \tag{2-1}$$

wherein D1 represents an ether unit containing a fluorine-containing ether group in its side chain and is represented by the formula (2a):

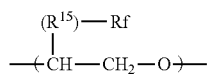

(2a)

wherein Rf represents a fluorine-containing ether group optionally containing a crosslinkable functional group, and $R^{15}$ represents a group or bond linking Rf to the trunk chain, FAE represents an ether unit containing a fluoroalkyl group in its side chain and is represented by the formula (2b):

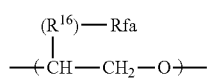

(2b)

wherein Rfa represents a hydrogen atom or a fluoroalkyl group optionally containing a crosslinkable functional group, and $R^{16}$ represents a group or bond linking Rfa to the trunk chain, AE represents an ether unit represented by the formula (2c):

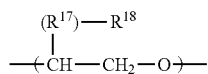

(2c)

wherein $R^{17}$ represents a hydrogen atom, an alkyl group optionally containing a crosslinkable functional group, an aliphatic cyclic hydrocarbon group optionally containing a crosslinkable functional group, or an aromatic hydrocarbon group optionally containing a crosslinkable functional group, and $R^{18}$ represents a group or bond linking $R^{17}$ to the trunk chain, Y represents a unit containing at least one of the groups represented by the formulae (2d-1) to (2d-3):

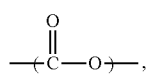

(2d-1)

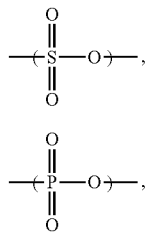

n represents an integer of 0 to 200, m represents an integer of 0 to 200, p represents an integer of 0 to 10,000, q represents an integer of 1 to 100, n+m is not 0, and the arrangement of D1, FAE, AE and Y is not specified; and P and Q may be the same as or different from each other and each represent a hydrogen atom, an alkyl group optionally containing a fluorine atom and/or a crosslinkable functional group, a phenyl group optionally containing a fluorine atom and/or a crosslinkable functional group, —COOH, —$OR^{19}$ in which $R^{19}$ is a hydrogen atom or an alkyl group optionally containing a fluorine atom and/or a crosslinkable functional group, an ester group or a carbonate group (when the end of D is an oxygen atom, P and Q are not —COOH, —$OR^{19}$, an ester group and a carbonate group).

The electrolytic solution of the present invention may optionally contain other additives. Examples of other additives include metal oxides and glass.

Preferably, the electrolytic solution of the present invention will neither freeze nor give a precipitate of the electrolyte salt even at low temperatures (for example, at 0° C. and −20° C.). Specifically, the electrolytic solution of the present invention has a viscosity at 0° C. of preferably not higher than 100 mPa·s, more preferably not higher than 30 mPa·s, and particularly preferably not higher than 15 mPa·s, and has a viscosity at −20° C. of preferably not higher than 100 mPa·s, more preferably not higher than 40 mPa·s, and particularly preferably not higher than 15 mPa·s.

The electrolytic solution having such characteristics is useful as an electrolytic solution for electric double layer capacitors because the flame retardance, solubility of an electrolyte salt, and compatibility with a hydrocarbon solvent are all improved and also because the electrolytic solution can maintain low-temperature characteristics and exhibits stable characteristics at a withstand voltage of higher than 3.5 V, or even at a withstand voltage of higher than 4.0 V.

In the electric double layer capacitor of the present invention, at least one of the positive electrode and the negative electrode is a polarizable electrode. The following electrodes, which are specifically described in JP 09-7896 A, may be used as polarizable and non-polarizable electrodes.

The polarizable electrode used in the present invention may be one mainly made of activated carbon and preferably containing inactivated carbon having a large specific surface area and a conductive material capable of imparting electronic conductivity, such as carbon black. This polarizable electrode can be prepared by various methods. For example, a polarizable electrode including activated carbon and carbon black can be prepared by mixing activated carbon powder, carbon black and phenol resin; and subjecting the mixture to press-molding and then to sintering in an inert gas atmosphere and activation in a steam atmosphere. Preferably, the polarizable electrode is bonded to a current collector with, for example, a conductive adhesive.

Alternatively, the polarizable electrode can be formed by kneading activated carbon powder, carbon black and a binder in the presence of an alcohol; molding the mixture into a sheet; and drying the molded sheet. Examples of the binder include polytetrafluoroethylene. The polarizable electrode may also be incorporated with a current collector by mixing activated carbon powder, carbon black, a binder and a solvent to give a slurry; applying this slurry to a metallic foil as a current collector; and drying the coat.

In the electric double layer capacitor, both the electrodes may be polarizable electrodes mainly made of activated carbon. Alternatively, one of the electrodes may be a non-polarizable electrode. In this case, for example, a polarizable electrode mainly made of activated carbon may be used as a negative electrode in combination with a positive electrode mainly made of an active material (e.g. a metal oxide), or may be used in combination with a negative electrode mainly made of a carbon material that is capable of reversibly occluding and releasing lithium ions or a negative electrode of a lithium metal or a lithium alloy.

In addition, carbonaceous materials such as carbon black, graphite, expansive graphite, porous carbon, carbon nanotube, carbon nanohorn and Ketjen black may be used instead of or in combination with activated carbon.

Preferably, the non-polarizable electrode is mainly made of a carbon material capable of reversibly occluding and releasing lithium ions, and used after lithium ions are occluded in the carbon material. In this case, the electrolyte is a lithium salt. The electric double layer capacitor having this structure achieves a higher withstand voltage of exceeding 4 V.

A preferred solvent for preparing a slurry used for production of an electrode is a solvent capable of dissolving a binder, and is appropriately selected from N-methylpyrrolidone, dimethylformamide, toluene, xylene, isophorone, methyl ethyl ketone, ethyl acetate, methyl acetate, dimethyl phthalate, ethanol, methanol, butanol, and water, depending on the kind of a binder to be used.

Examples of activated carbon for the polarizable electrode include phenol resin-based activated carbon, coconut shell-based activated carbon, and petroleum coke-based activated carbon. Among these, petroleum coke-based activated carbon and phenol resin-based activated carbon are preferably used because they increase capacitance. Examples of the activation treatment of activated carbon include steam activation and molten KOH activation. Activated carbon obtained by molten KOH activation is preferably used because it increases capacitance.

Examples of preferred conductive materials for the polarizable electrode include carbon black, Ketjen black, acetylene black, natural graphite, artificial graphite, metallic fibers, conductive titanium oxide, and ruthenium oxide. The amount of a conductive material such as carbon black used in the polarizable electrode is preferably 1 to 50% by mass based on the total amount of the conductive material and activated carbon. This is for the purpose of achieving satisfactory conductivity (low internal resistance) and also because an excessively high content of the conductive material decreases the capacitance of a product.

In order to produce an electric double layer capacitor with larger capacitance and lower internal resistance, activated carbon for the polarizable electrode is preferably one having an average particle size of not more than 20 μm and a specific surface area of 1500 to 3000 m$^2$/g. Examples of carbon materials that can be preferably used for electrodes mainly made of a carbon material capable of reversibly occluding and releasing lithium ions include natural graphite, artificial graphite, graphitized mesocarbon particles, graphitized whiskers, vapor grown carbon fibers, calcined products of furfuryl alcohol resins, and calcined products of novolak resins.

Any current collectors can be used as long as they are resistant to chemical and electrochemical corrosion. Preferred examples of current collectors for a polarizable electrode mainly made of activated carbon include current collectors of stainless steel, aluminum, titanium, or tantalum. Among these, stainless steel and aluminum are particularly preferable materials in both terms of characteristics of the resulting electric double layer capacitor and costs. Preferred examples of a current collector for an electrode mainly made of a carbon material capable of reversibly occluding and releasing lithium ions include current collectors of stainless steel, copper or nickel.

Lithium ions are preliminarily occluded in the carbon material capable of reversibly occluding and releasing lithium ions, for example, by the following methods: (1) by preliminarily mixing lithium powder with the carbon material capable of reversibly occluding and releasing lithium ions; (2) by mounting a lithium foil on an electrode made of a binder and the carbon material capable of reversibly occluding and releasing lithium ions, and immersing the electrode in an electrolytic solution containing a lithium salt dissolved therein while maintaining electrical contact between the lithium foil and the electrode, so that lithium is ionized and taken into the carbon material; and (3) by immersing a lithium metal placed on the positive side and an electrode made of a binder and the carbon material capable of reversibly occluding and releasing lithium ions which is placed on the negative side in a non-aqueous electrolytic solution containing a lithium salt as an electrolyte, and applying a current such that lithium is electrochemically taken into the carbon material, in an ionized form.

Commonly known electric double layer capacitors are of a wound type, a laminated type, and a coin type. The electric double layer capacitor of the present invention can also employ these types.

For example, in the case of a wound type electric double layer capacitor, the capacitor is assembled by winding a positive electrode and a negative electrode each of which includes a laminate (electrode) of a current collector and an electrode layer, through a separator to produce a wound element, putting the wound element into a case made of aluminum or the like, filling the case with an electrolytic solution, preferably a non-aqueous electrolytic solution, and then sealing the case with a seal made of rubber.

A separator made of a conventionally known material and having a conventionally known structure can also be used in the present invention. Examples of the separator include polyethylene porous films, polypropylene fibers, glass fibers, and nonwoven fabrics of cellulose fibers.

It is also possible to produce, by a known method, a laminated type electric double layer capacitor in which a sheet-shaped positive electrode and a sheet-shaped negative electrode are laminated through an electrolytic solution and a separator, or a coin-type electric double layer capacitor including a coin-shaped positive electrode and a coin-shaped negative electrode fixed with a gasket through an electrolytic solution and a separator.

In addition, the electrolytic solution of the present invention is also useful as an electrolytic solution for various types of electrochemical devices including an electrolytic solution other than electric double layer capacitors. Examples of such electrochemical devices include lithium secondary batteries, radical batteries, solar cells (particularly, dye-sensitized solar cells), fuel cells, various electrochemical sensors, electrochromic devices, electrochemical switching elements, aluminum electrolytic capacitors, and tantalum electrolytic capacitors. In particular, the electrolytic solution is suitably used for lithium secondary batteries. In addition, the electrolytic solution of the present invention can also be used as, for example, an ionic conductor for an antistatic coating material.

EXAMPLES

Next, the present invention will be described based on Examples and Comparative Examples, but the present invention is not limited only to these examples.

Example 1

Production of Electrode

A slurry for electrodes was prepared by mixing 100 parts by weight of activated carbon particles (YP50F available from Kuraray Chemical Co., Ltd., specific surface area: 1600 m$^2$/g, average particle size: 6 μm), 3 parts by weight of acetylene black (DENKA BLACK available from DENKI KAGAKU KOGYO K.K.) as a conductive additive, 16 parts by weight of Ketjen Black (Carbon ECP600JD available from Lion Corporation), 6 parts by weight of an elastomer binder (AZ-9001 available from ZEON Corporation), and 3 parts by weight of a surfactant (A10H available from Toagosei Co., Ltd.).

An edged aluminum (20CB available from Japan Capacitor Industrial Co., Ltd., thickness: about 20 μm) was prepared as a current collector, and both surfaces of the current collector were coated with a conductive coating material (Varniphite T602 available from Nippon Graphite Industries, Ltd.) using a coating device to form a conductive layer (thickness: 2 μm).

Subsequently, the slurry for electrodes prepared as described above was applied to the conductive layer formed on both surfaces of the current collector using a coating device to form an electrode layer (thickness: 110 μm) to produce an electrode.

Note that a current collector, a conductive layer, and an activated carbon layer are hereinafter collectively referred to as the electrode.

(Production of Wound Type Cell)

The electrode produced as described above was cut to a width of 31 mm, and was then wound together with a separator produced by cutting TF45-30 of Nippon Kodoshi Corporation to a width of 34 mm using a winding machine for EDLC. At that time, a tab lead for drawing electrodes was joined to the electrode by caulking to produce a cylindrical wound body having a diameter of 16 mm.

Then, after vacuum drying the cylindrical wound body, a cylindrical aluminum case, and rubber packing, the cylindrical wound body was inserted into the cylindrical aluminum case in a dry chamber, followed by pouring an electrolytic solution to be described below into the case and sealing the case with the rubber packing to produce a wound-cell type (ϕ18 mm×40 mm) electric double layer capacitor.

(Preparation of Electrolytic Solution)

Sulfolane, $HCF_2CF_2CH_2OCF_2CF_2H$, and dimethyl carbonate were mixed at a volume ratio of 65/15/20 to prepare a solvent for dissolving an electrolyte salt. Spiro-bipyridinium tetrafluoroborate ($SBPBF_4$) was added to the solvent for dissolving an electrolyte salt to a concentration of 1.2 mol/l. As a result, the salt was dissolved uniformly.

(Evaluation of Characteristics of Capacitor)

The resulting electric double layer capacitor was measured for the initial characteristics and withstand voltage. The results are shown in Table 1.

(1) Initial Characteristics

An electronic power source is connected to the wound cell of the capacitor, and then the charging voltage is increased to a specified voltage, while charging constant current to the wound cell. After the charging voltage reaches the specified voltage, the constant voltage state is maintained for 10 minutes, and it is verified that the charging current has been sufficiently decreased and saturated. Then, constant-current discharge is started, and cell voltage is measured every 0.1 second. The capacitance (F) and internal resistance (mΩ) of the capacitor are measured in accordance with the instrumentation method of RC2377 of Japan Electronics and Information Technology Industries Association (JEITA).

(Measurement Conditions of RC2377 of JEITA)

Source voltage: 3.0 and 3.1 V

Discharging current: 500 mA (the measured capacitance of the produced wound cell was 50 F)

(2) Withstand Voltage (Long Term Reliability Test)

A wound cell type capacitor is put in a constant temperature bath at a temperature of 70° C.; a voltage of 3.0 V or 3.1 V is applied for 500 hours; and capacitance and internal resistance are measured. The measurement is performed at the following time points: initial (0 hour), 157 hours, 337 hours, 500 hours, and 1000 hours. From the obtained measured values, a capacitance retention (%) and an internal resistance increasing rate (%) were calculated according to the following calculation formulas. The results are shown in Table 1.

Capacitance retention (%)=(capacitance at each time point/capacitance before starting evaluation (initial))×100

Internal resistance increasing rate (%)=(internal resistance at each time point/internal resistance before starting evaluation (initial))×100

Note that a capacitor having a capacitance retention of 70% or more and an internal resistance increasing rate of 400% or less after 500 hours is excellent in load characteristics at a high temperature (70° C.) and also excellent in cycle characteristics and rate performance in use at ordinary temperature, and has long term reliability.

Example 2

Sulfolane, $HCF_2CF_2CH_2OCF_2CF_2H$, and dimethyl carbonate were mixed at a volume ratio of 65/15/20 to prepare a solvent for dissolving an electrolyte salt. Triethylmethylammonium tetrafluoroborate ($TEMABF_4$) was added to the solvent for dissolving an electrolyte salt to a concentration of 1.2 mol/l. As a result, the salt was dissolved uniformly. A wound-cell type electric double layer capacitor was produced in the same manner as in Example 1 using the resulting solution as an electrolytic solution, and various kinds of tests were performed thereon. The results are shown in Table 1.

Example 3

Sulfolane and $HCF_2CF_2CH_2OCF_2CF_2H$ were mixed at a volume ratio of 75/25 to prepare a solvent for dissolving an electrolyte salt. Spiro-bipyridinium tetrafluoroborate (SB-$PBF_4$) was added to the solvent for dissolving an electrolyte salt to a concentration of 1.2 mol/l. As a result, the salt was dissolved uniformly. A wound-cell type electric double layer capacitor was produced in the same manner as in Example 1 using the resulting solution as an electrolytic solution, and various kinds of tests were performed thereon. The results are shown in Table 1.

Example 4

Sulfolane and $HCF_2CF_2CH_2OCF_2CF_2H$ were mixed at a volume ratio of 75/25 to prepare a solvent for dissolving an electrolyte salt. Triethylmethylammonium tetrafluoroborate ($TEMABF_4$) was added to the solvent for dissolving an electrolyte salt to a concentration of 1.2 mol/l. As a result, the salt was dissolved uniformly. A wound-cell type electric double layer capacitor was produced in the same manner as in Example 1 using the resulting solution as an electrolytic solution, and various kinds of tests were performed thereon. The results are shown in Table 1.

Example 5

Sulfolane, $HCF_2CF_2CH_2OCF_2CF_2H$, and ethyl methyl carbonate were mixed at a volume ratio of 65/15/20 to prepare a solvent for dissolving an electrolyte salt. Triethylmethylammonium tetrafluoroborate ($TEMABF_4$) was added to the solvent for dissolving an electrolyte salt to a concentration of 1.2 mol/l. As a result, the salt was dissolved uniformly. A wound-cell type electric double layer capacitor was produced in the same manner as in Example 1 using the resulting solution as an electrolytic solution, and various kinds of tests were performed thereon. The results are shown in Table 1.

Comparative Example 1

$HCF_2CF_2CH_2OCF_2CF_2H$ and propylene carbonate were mixed at a volume ratio of 20/80 to prepare a solvent for dissolving an electrolyte salt. Spiro-bipyridinium tetrafluoroborate ($SBPBF_4$) was added to the solvent for dissolving an electrolyte salt to a concentration of 1.2 mol/l. As a result, the salt was dissolved uniformly. A wound-cell type electric double layer capacitor was produced in the same manner as in Example 1 using the resulting solution as an electrolytic solution, and various kinds of tests were performed thereon. The results are shown in Table 1.

Comparative Example 2

Sulfolane and dimethyl carbonate were mixed at a volume ratio of 75/25 to prepare a solvent for dissolving an electrolyte salt. Spiro-bipyridinium tetrafluoroborate ($SBPBF_4$) was added to the solvent for dissolving an electrolyte salt to a concentration of 1.2 mol/l. As a result, the salt was dissolved uniformly. A wound-cell type electric double layer capacitor was produced in the same manner as in Example 1 using the resulting solution as an electrolytic solution, and various kinds of tests were performed thereon. The results are shown in Table 1.

Comparative Example 3

$HCF_2CF_2CH_2OCF_2CF_2H$ and dimethyl carbonate were mixed at a volume ratio of 20/80 to prepare a solvent for dissolving an electrolyte salt. Spiro-bipyridinium tetrafluoroborate ($SBPBF_4$) was added to the solvent for dissolving an electrolyte salt, but the salt was not dissolved uniformly.

| | Example | | | | | Comparative Example | |
|---|---|---|---|---|---|---|---|
| | 1 | 2 | 3 | 4 | 5 | 1 | 2 |
| Initial characteristics | | | | | | | |
| Capacitance (F) | 50 | 50 | 50 | 50 | 50 | 50 | 50 |
| Internal resistance (mΩ) | 50 | 50 | 50 | 50 | 50 | 50 | 50 |
| Withstand voltage | | | | | | | |
| 3.0 V Capaticance retention (%) | | | | | | | |
| Initial (0 hour) | 100 | 100 | 100 | 100 | 100 | 100 | 100 |
| 157 hours | 89 | 89 | 89 | 91 | 87 | 76 | 81 |
| 337 hours | 86 | 87 | 89 | 91 | 84 | 59 | 65 |
| 500 hours | 85 | 85 | 88 | 90 | 80 | 17 | — |
| 1000 hours | 77 | 74 | 85 | 86 | 70 | — | — |
| Resistance increasing rate (%) | | | | | | | |
| Initial (0 hour) | 100 | 100 | 100 | 100 | 100 | 100 | 100 |
| 157 hours | 121 | 137 | 110 | 108 | 142 | 150 | 175 |
| 337 hours | 131 | 141 | 125 | 122 | 150 | 300 | 270 |
| 500 hours | 142 | 155 | 131 | 128 | 164 | 1402 | — |
| 1000 hours | 181 | 192 | 153 | 149 | 199 | — | — |
| 3.1 V Capaticance retention (%) | | | | | | | |
| Initial (0 hour) | 100 | 100 | 100 | 100 | 100 | 100 | 100 |
| 157 hours | 87 | 87 | 88 | 91 | 84 | 20 | 35 |
| 337 hours | 81 | 80 | 85 | 87 | 78 | — | — |
| 500 hours | 77 | 75 | 83 | 85 | 70 | — | — |
| 1000 hours | 54 | 31 | 79 | 80 | 28 | — | — |
| Resistance increasing rate (%) | | | | | | | |
| Initial (0 hour) | 100 | 100 | 100 | 100 | 100 | 100 | 100 |
| 157 hours | 130 | 145 | 120 | 116 | 152 | 1441 | 1354 |
| 337 hours | 139 | 141 | 125 | 123 | 154 | — | — |
| 500 hours | 188 | 200 | 150 | 145 | 230 | — | — |
| 1000 hours | 422 | 615 | 182 | 171 | 568 | — | — |

It is shown that the initial electrical characteristics are good (low resistance) even at high voltage (3.1 V) and sufficient long term reliability is achieved, by a combined use of sulfolane.

What is claimed is:

1. An electrolytic solution for an electric double layer capacitor comprising a solvent (I) for dissolving an electrolyte salt and an electrolyte salt (II),
    wherein the solvent (I) for dissolving an electrolyte salt comprises a sulfolane compound and a fluorine-containing chain ether and,
    wherein the fluorine-containing chain ether is represented by the formula: $Rf^1$—O—$Rf^2$, wherein $Rf^1$ is a fluoroalkyl group having 1 to 10 carbon atoms, and $Rf^2$ is an alkyl group having 1 to 4 carbon atoms which may contain fluorine, and
    wherein the electrolyte salt (II) is a spiro-bipyridinium salt, a triethylmethylammonium salt, or a tetraethylammonium salt.

2. The electrolytic solution for an electric double layer capacitor according to claim 1,
    wherein the sulfolane compound is sulfolane.

3. The electrolytic solution for an electric double layer capacitor according to claim 1,
    wherein the fluorine-containing chain ether is at least one selected from the group consisting of $HCF_2CF_2CH_2OCF_2CFHCF_3$, $HCF_2CF_2CH_2OCF_2CF_2H$, $CF_3CF_2CH_2OCF_2CFHCF_3$, and $CF_3CF_2CH_2OCF_2CF_2H$.

4. The electrolytic solution for an electric double layer capacitor according to claim 1,
   wherein the solvent (I) for dissolving an electrolyte salt comprises at least one selected from the group consisting of cyclic carbonates and chain carbonates.

5. An electric double layer capacitor comprising:
   an electrolytic solution according to claim 1;
   a positive electrode; and
   a negative electrode.

\* \* \* \* \*